United States Patent [19]

Ishikawa et al.

[11] Patent Number: 4,713,696
[45] Date of Patent: Dec. 15, 1987

[54] PICTURE BLOCK RETRANSMISSION ARRANGEMENT RAPIDLY OPERABLE EVEN WHEN A TRANSMISSION PATH HAS AN INFERIOR QUALITY

[75] Inventors: Takashi Ishikawa; Hiroshi Fukagawa; Hiroyasu Matsui, all of Tokyo, Japan

[73] Assignee: NEC Corporation, Japan

[21] Appl. No.: 922,195

[22] Filed: Oct. 23, 1986

[30] Foreign Application Priority Data

Oct. 28, 1985 [JP] Japan .................. 60-242072

[51] Int. Cl.$^4$ .............................................. H04N 1/413
[52] U.S. Cl. ...................................... 358/261; 358/135
[58] Field of Search ............... 358/260, 261, 264, 256, 358/283, 133, 135

[56] References Cited

U.S. PATENT DOCUMENTS

| | | | |
|---|---|---|---|
| 4,223,356 | 9/1980 | Renelt | 358/261 |
| 4,533,957 | 8/1985 | Iinuma | 358/261 |
| 4,590,521 | 5/1986 | Rallapalli | 358/261 |
| 4,654,719 | 3/1987 | Tomita | 358/135 |

Primary Examiner—Tommy P. Chin
Attorney, Agent, or Firm—Laff, Whitesel, Conte & Saret

[57] ABSTRACT

In a picture block retransmission arrangement of a receiver in which a band-compression encoded picture block signal transmitted from a counterpart transmitter is decoded into a reproduced block signal comprising reproduced line signals representative of successive picture lines on a picture block, a checking arrangement (42, 43) checks whether each reproduced line signal is a correct or an incorrect line signal. A retransmission requesting assembly (44, 45, 15, 12) requests the transmitter to again transmit the picture block signal when the incorrect line signals are not less in number than a predetermined number. A substituting assembly (38, 41, 17, 46, 15) substitutes, for each incorrect line signal representative of a particular one of the picture lines, an again reproduced line signal decoded from one of the picture line signals that represents the particular picture line in the picture block signal retransmitted from the transmitter. In most cases, the picture block signal need not be further retransmitted even when the checking arrangement checks a substituted block signal wherein the again reproduced line signal is substituted for each incorrect line signal. The substituting assembly preferably comprises a storage memory (41) for storing, for a picture block reproduction of the picture block signal first transmitted from the transmitter, picture line reproductions of the picture line signals together with marks indicative of whether the respective picture line reproductions is correct or not.

5 Claims, 7 Drawing Figures

PICTURE BLOCK RETRANSMISSION ARRANGEMENT RAPIDLY OPERABLE EVEN WHEN A TRANSMISSION PATH HAS AN INFERIOR QUALITY

BACKGROUND OF THE INVENTION

This invention relates to a picture block retransmission arrangement for use in a pattern or picture signal receiver as, for example, a facsimile receiver in requesting a counterpart transmitter to again transmit or retransmit a picture block signal, comprising a plurality of band-compression encoded picture line signals, as a retransmitted block signal which is for use in correcting errors found in the picture block signal transmitted to the receiver previous to the retransmitted block signal and is making the receiver receive such a picture block signal eventually with no or little error.

A picture block retransmission arrangement of the type described, is already known. For example, a method and an arrangement for facsimile picture transmission are disclosed in U.S. Pat. No. 4,223,356 issued to Gerhard Renelt et al and assigned to U.S. Philips Corporation.

In the manner known in the art, the picture line signals are representative of successive picture or scanning lines of an original pattern, respectively. The picture block signal represents a picture block of the original pattern which is transmitted from the counterpart transmitter to the receiver as a pattern or picture signal through a transmission path or channel between the transmitter and the receiver. Depending on the circumstances, the original pattern may consist of a picture block alone. The picture block signal may be said under the circumstances to represent the original pattern. At any rate, the transmission path is susceptible to disturbances, such as occurrence of noise, to have an inferior quality of introducing errors into the pattern signal. In this event, the picture block signal arrives at the receiver with one or more errors.

The receiver comprises a decoding circuit for decoding the picture block signal transmitted from the transmitter into a reproduced block signal. A picture block retransmission arrangement of the receiver requests the transmitter to again transmit the picture block signal as the above-mentioned retransmitted block signal whenever the errors of the reproduced block signal are not less in number than a predetermined number. The decoding circuit decodes the retransmitted block signal into another reproduced block signal. When it is desired to discriminate between the first-mentioned and the last-mentioned reproduced block signals by name, the first-mentioned reproduced block signal may be called a previous block signal. The last-mentioned reproduced block signal may be named a new block signal. In any event, each reproduced block signal comprises a plurality of reproduced line signals which are representative of the successive picture lines to correspond to the respective picture lines. As the case may be, each reproduced line signal of the new block signal will be referred to as an again reproduced line signal.

In the manner which will later be described in detail, a conventional picture block retransmission arrangement comprises a checking circuit for checking whether or not each reproduced block signal has errors. A retransmission requesting circuit requests the transmitter to again transmit the picture block signal whenever the errors are not less in number than a predetermined number. A substituting circuit substitutes the new block signal for the previous block signal on a block-by-block basis to produce a substituted block signal. The substituted block signal may have errors which are again not less in number than the predetermined number. In such an event, retransmission of the picture block signal must be requested again and again. A long transmission time is therefore necessary when the transmission path has an inferior quality. In a worst case, transmission of the original pattern does not converge, namely, never comes to an end.

SUMMARY OF THE INVENTION

It is therefore an object of the present invention to provide a picture block retransmission arrangement which is operable within a short transmission time even when a transmission path has an inferior quality.

Other objects of this invention will become clear as the description proceeds.

A picture block retransmission arrangement to which this invention is applicable, is included in a receiver for use in combination with a transmitter for transmitting a picture block signal comprising a plurality of band-compression encoded picture line signals which are representative of successive picture lines of an original pattern, respectively. The receiver comprises decoding means for decoding the picture block signal transmitted from the transmitter into a reproduced block signal comprising a plurality of reproduced line signals which are representative of the successive picture lines to correspond to the respective picture lines. According to this invention, the picture block retransmission arrangement comprises; checking means for checking whether each reproduced line signal is a correct line signal correctly representative of a corresponding one of the successive picture lines or is an incorrect line signal which is not the correct line signal; retransmission requesting means for requesting the transmitter to again transmit the picture block signal as a retransmitted block signal when the incorrect line signals are not less in number than a predetermined number; and substituting means for substituting an again reproduced line signal for each incorrect line signal to produce a substituted block signal when both the again reproduced line signal and the last-mentioned each incorrect line signal correspond to a single one of the successive picture lines, the again reproduced line signal being one of the reproduced line signals of the reproduced block signal into which the retransmitted block signal is decoded by the decoding means.

DESCRIPTION OF THE PREFERRED EMBODIMENT

Figure 1:
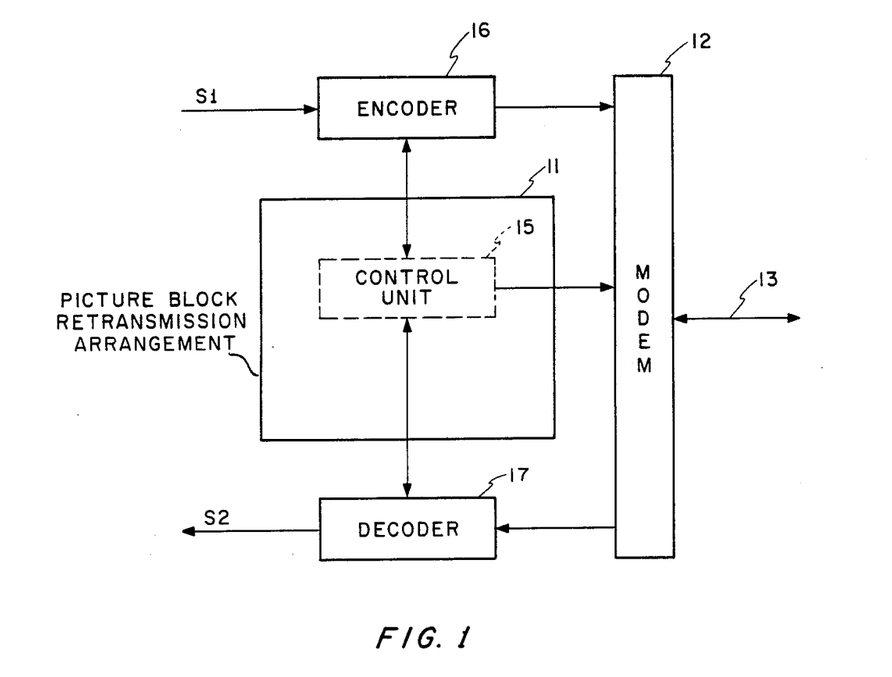
FIG. 1 is a partial block diagram of a transmitter/receiver comprising a picture block retransmission arrangement to which the instant invention is applicable.

Referring to FIG. 1, a transmitter/receiver is for use in a pattern or picture signal transmission network and comprises a transmitter and a receiver which will presently be described. The transmitter/receiver further comprises a picture block retransmission arrangement 11 which will later be described more in detail. A modem 12 is shared by the transmitter and the receiver and is connected to a transmission path or channel 13 of the pattern signal transmission network. The transmitter, the receiver, and the picture block retransmission arrangment 11 are cooperative with a control unit 15 which is depicted within the picture block retransmission arrangement 11 for convenience of illustration. It will hereafter be assumed merely for simplicity of description that the transmitter/receiver is a facsimile transmitter/receiver and consequently that the pattern signal transmission network is a fascsimile transmission network.

On transmitting an original pattern (not herein shown) to a desired receiver (not shown) of the fascsimile transmission network, the original pattern is scanned line by line along successive picture or scanning lines in the manner known in the art. The transmitter comprises an encoder 16 for encoding an input signal S1 representative of the original pattern into a band-compression encoded signal which ordinarily comprises a plurality of picture block signals in the manner which will become clear as the description proceeds. Each picture block signal comprises a plurality of picture line signals which are representative of the successive picture lines, respectively, and into which the input signal S1 is band-compression encoded. Responsive to the encoded signal, the modem 12 supplies the transmission path 13 with a modulated signal which carries the encoded signal and is herein called a pattern or picture signal.

It will now be surmised that an original pattern is transmitted in this manner from a certain transmitter 14 of the facsimile transmission network to the receiver illustrated in FIG. 1. The transmitter under consideration is the counterpart transmitter described heretobefore. Another modulated signal of the type described, is transmitted in this event from the counterpart transmitter to the receiver being illustrated through the transmission path 13 to reach the modem 12. Responsive to the modulated signal transmitted from the counterpart transmitter, the modem 12 delivers a demodulated signal to a decoder 17 for decoding the demodulated signal into a decoded signal.

The decoded signal comprises a reproduced block signal into which decoded is each picture block signal produced in the counterpart transmitter. The reproduced block signal comprises a plurality of reproduced line signals into which decoded are the respective picture line signals produced in the counterpart transmitter. It is therefore possible to understand that the reproduced line signals are representative of the successive picture lines to correspond to the respective picture lines. It may be mentioned here in this connection that the picture line signals also correspond to the respective picture lines.

When the transmission path 13 is subjected to no disturbance, the reproduced line signals are correct reproductions of the respective picture lines. In order to reproduce the original pattern as a received pattern, the decoded signal is dilivered from the decoder 17 as an output signal S2 to a recorded which will later be illustrated.

The transmission path 13 is, however, susceptible to disturbances so that noise may be superposed on the modulated signal arriving at the modem 12. Under the circumstances, the reproduced block signal has at least one error. More particularly, most of the reproduced line signals may be correct line signals which have no error and are correctly representative of corresponding ones of the successive picture lines. Others of the reproduced line signals may have errors and are incorrect line signals which are not the correct line signals and are not correctly representative of corresponding ones of the successive picture lines.

Figure 2:
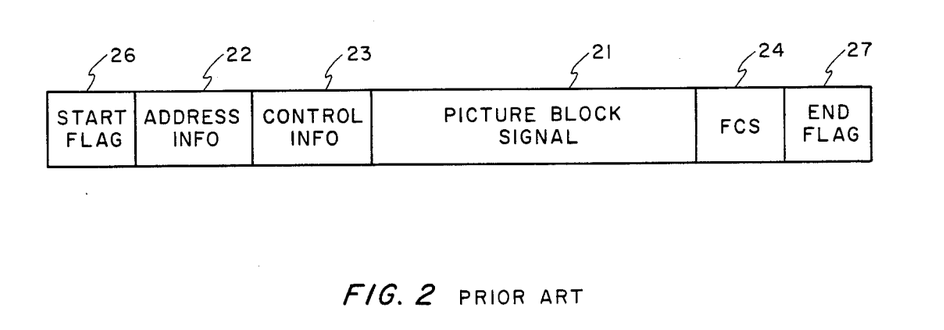
FIG. 2 shows a conventional pattern signal frame used in a conventional picture block retransmission arrangement.

Turning to FIG. 2, each frame of the encoded signal has, for a conventional picture block retransmission arrangement, a frame format being illustrated. The frame format is based on Recommendation X25 of the International Telegraph and Telephone Consultative Committee (CCITT).

A certain number of the picture line signals are collected to have a total length which is not longer than a predetermined block length. The picture block signal is depicted at 21 and has the predetermined block length. In this manner, the picture block signal 21 comprises a plurality of picture line signals. The frame is formed by adding address information 22, control information 23, a frame check sequence (FCS) 24, a start flag 26, and an end flag 27 to the picture block signal 21. The start and the end flags 26 and 27 are for indicating start and end of each frame. The address information 22 is for use in identifying each frame relative to at least next preceding and succeeding frames. The frame check sequence 24 is for use in checking whether or not the picture block signal 21 of the frame has at least one error when the encoded signal is decoded into the decoded signal by the decoder 17 described in conjunction with FIG. 1.

Turning back to FIG. 1, it will be presumed at first that the picture block retransmission arrangement 11 is a conventional picture block retransmission arrangement which is operable in response to the encoded signal produced in the counterpart transmitter with the frame format illustrated with reference to FIG. 2. Supplied through the transmission path 13 with the modulated signal which carries the encoded signal, the modem 12 produces the demodulated signal also with the frame format. In the decoded signal produced by the decoder 17, the reproduced block signal usually has a longer duration than the predetermined block length. This is because each picture line signal of the picture block signal 21 is a band-compressed representation of a corresponding one of the successive picture lines. On the other hand, each reproduced line signal of the reproduced block signal has a line duration determined by scanning throughout a corresponding one of the seccessive picture lines. Although the longer duration may vary from a reproduced block signal to another, the decoder 17 produces the decoded signal which includes the frame check sequence 24 in addition to each reproduced block signal.

Supplied with the frame check sequence 24 from the decoder 17, the picture block retransmission arrangement 11 checks whether or not each reproduced block signal has errors which are not less in number than the predetermined number mentioned hereinabove. It will be surmised that the reproduced block signal is produced by the decoder 17 as a first block signal with errors of such a number. In this event, the picture block retransmission arrangement 11 makes the modem 12 transmit a retransmission request signal to the counterpart transmitter through the transmission path 13. Before moduleted by the modem 12, the retransmission request signal may be a tone signal of a predetermined frequency. The tone signal may be delivered from the picture block retransmission arrangement 11 to the modem 12 through a connection depicted therebetween.

Responsive to the retransmission request signal, the counterpart transmitter again transmits that part of the modulated signal which comprises the picture block signal previously received by the receiver as the first block signal. In other words, the counterpart transmitter again transmits the picture block signal in question as the retransmitted block signal mentioned before. Supplied with the retransmitted block signal through the modem 12, the decoder 17 produces another reproduced block signal as a second block signal. It should be noted that the retransmitted block signal is not different, except for time instants of transmission, from the picture block signal transmitted by the counterpart transmitter previous to the retransmitted block signal. The first and the second block signals are alternatively called a previous and a new block signal.

Irrespective of presence and absence of errors in the new block signal, the picture block retransmission arrangement 11 cooperates with the decoder 17 to substitute the new block signal for the previous block signal on a block-by-block basis. The decoder 17 thereby produces a substituted block signal. During substitution, the decoder 17 suspends delivery of the output signal 82 to the recorder. In the meanwhile, the picture block retransmission arrangement 11 again checks whether or not the substituted block signal has errors which are not less in number than the predetermined number. Only when the substituted block signal has less errors, the output signal S2 is produced insofar as the previous and the new block signals are concerned. In this manner, transmission of the original pattern will come to an end.

When the substituted block signal again has errors which are not less in number than the predetermined number, the picture block retransmission arrangement 11 makes the modem 12 transmit another retransmission request signal of the type described to the counterpart transmitter. A long transmission time is therefore necessary with the conventional picture block retransmission arrangement to correctly receive the received pattern as long as the transmission path 13 has an inferior quality. In a worst case, the received pattern can not be obtained within a finite time duration. In other words, transmission of the original pattern does not converge, namely, never comes to an end.

Figure 3:
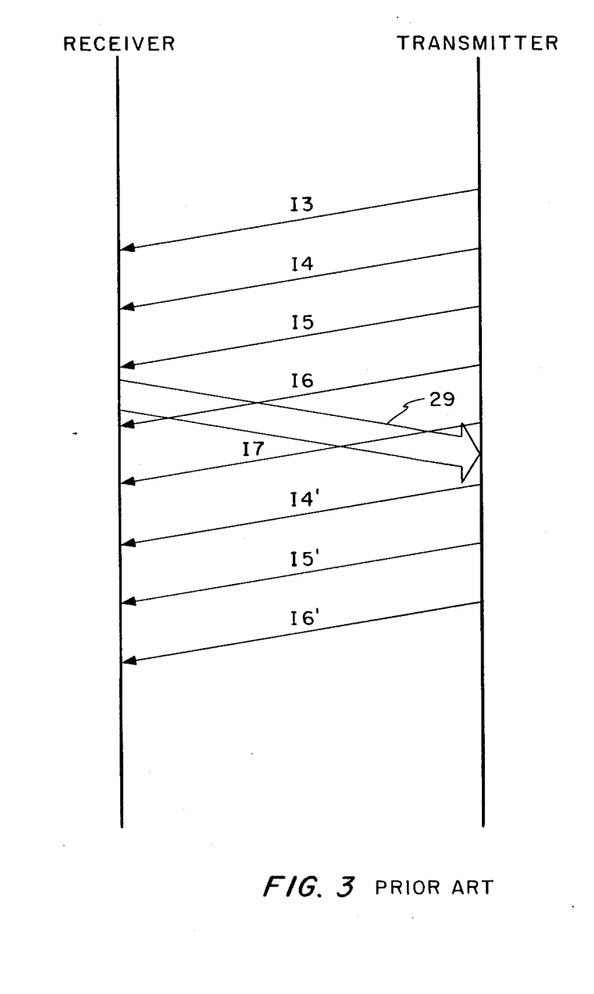
FIG. 3 shows a sequence of operation carried out for retransmission of at least one picture block signal by the conventional picture block retransmission arrangement mentioned in conjunction with FIG. 2.

Further turning to FIG. 3, operation of the conventional picture block retransmission arrangement is as follows in practice when facsimile transmission is carried out in the facsimile transmission network according to the half duplex transmission known in the art. The counterpart transmitter consecutively transmits first through seventh frames in the manner depicted for the third through the seventh frames at 13 to 17. Such frames are identified by the address information 22 (FIG. 2) of the respective frames. Let the errors be found to be not less in number than the predetermined number in the afore-mentioned first block signal which is derived in the receiver from the fifth frame 15. The modes 12 (FIG. 1) of the receiver transmits the retransmission request signal to the counterpart transmitter as schematically indicated at 29 by a double-line arrow.

Due to an inevitable delay in finding the error or errors, the retransmission request signal reaches the counterpart transmitter after transmission therefrom of the seventh frame 17. The counterpart transmitter again transmits a preselected number of frames. In the example being illustrated, the fourth through the sixth frames 14 to 16 are retransmitted as new fourth through sixth frames 14' to 16'. In the meanwhile, the receiver suspends production of the output signal S2 (FIG. 1). With reference to the address information 22 (FIG. 2) of the third through the seventh frames 13 to 17 and of the new fourth through sixth frames 14' to 16', the output signal S2 is produced in correspondence to the third frame 13 and the new fourth through sixth frames 14' to 16' provided that such frames are received by the receiver with no error.

In connection with the conventional picture block retransmission arrangement described with reference to FIGS. 2 and 3, the long transmission time might be shortened if the picture block signal 21 were made to carry as little information as possible and thereby to have a shorter block length as compared with the predetermined block length described above. The long transmission time would be shortened because only a part of the predetermined block length would be subjected to retransmission despite the fact that most of the predetermined block length need not be retransmitted. Exaggeratedly speaking, it would be most effective to retransmit each erroneous bit alone.

Attention should, however, be directed to the facts that the encoded signal must be divided into an increased number of frames and that each frame of the encoded signal must comprise the address and the control information 22 and 23, the frame check sequence 24, and the start and the end flags 26 and 27 in addition to the picture block signal 21. The increased number of frames results in an increased amount of the address and the control information 22 and 23, the frame check sequence 24, and the start and the end flags 26 and 27. Furthermore, retransmission must be carried out an increased number of times although the retransmission may be for each frame of a reduced frame length. Due to the increased amount and the increased number of times, the transmission time is not necessarily shortened. The long transmission time has therefore been regarded unavoidable as an extraordinary condition which must unwillingly be accepted when the transmission path 13 (FIG. 1) happens to have an inferior quality.

Figure 4:
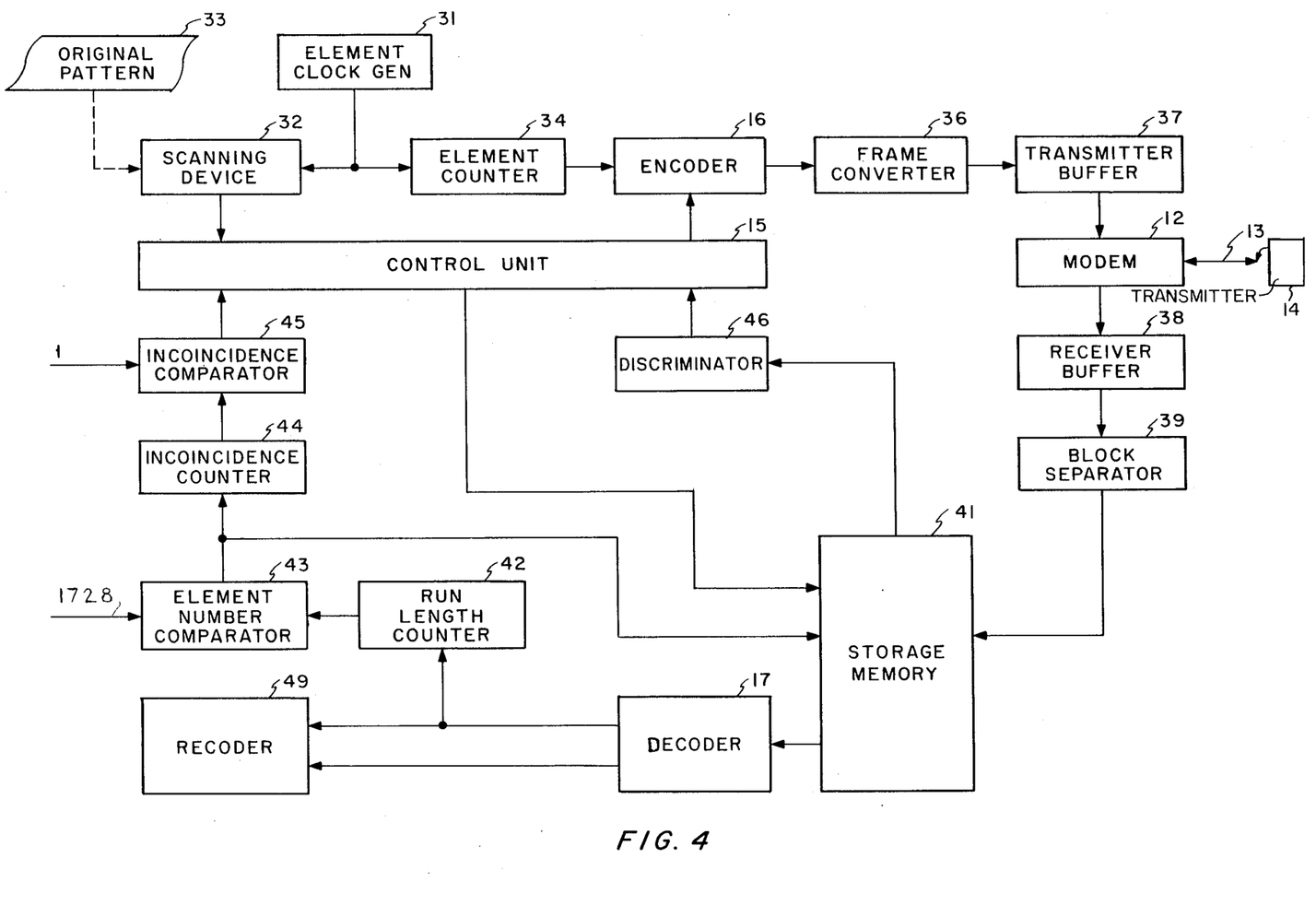
FIG. 4 is a block diagram of a transmitter/receiver which comprises a picture block retransmission arrangement according to an embodiment of this invention.

Referring now to FIG. 4, a transmitter/receiver comprises a picture block retransmission arrangement according to a preferred embodiment of this invention in the manner which will be described in the following. Like in FIG. 1, the transmitter/receiver includes a modem 12 connected to a transmission path or channel 13 of the facsimile transmission network under consideration. The transmitter/receiver further includes a control unit 15, an encoder, and a decoder. The control unit 15 comprises a microprocessor (not shown) to be operable in the manner which will become clear as the description proceeds. The encoder and the decoder are disignated by the reference numerals 16 and 17 although the encoder 16 and the decoder 17 in FIG. 4 are parts of those described in conjunction with FIG. 1 as will presently become clear.

An element clock generator 31 is for generating a sequence of element clock pulses. Responsive to the element clock pulses, a scanning device 32 scans an original pattern on a sheet 33 along successive picture or scanning lines and produces picture element signals in compliance with luminance values along the respective picture lines. It will be assumed throughout the following that the picture element signals have binary one and zero values depending on the luminance values. The picture element signals will therefore be called a transmitter binary signal. Responsive to the element clock pulses, an element counter 34 counts up an element count to a prescibed number which depends on the number of picture elements along each picture line. Throughout the example being illustrated, it will be presumed that each picture line consists of 1,728 picture elements so that the prescribed number be equal to 1,728.

Supplied with the transmitter binary signal from the scanning device 32, the control unit 15 detects each varying instant at which the binary values vary from one to the other. The control unit 15 thereby delivers a coding request signal to the encoder 16. Heading the element count from the element counter 34 at the varying instant indicated by the coding request signal, the encoder 16 calculates a run length for each binary value and encodes such run lengths into a band-compression encoded signal which comprises the afore-described picture line signals for the respective picture lines. It is preferred that the encoder 16 should encode the run lengths into the modfified Huffman (MH) codes known in the art.

Figure 5:
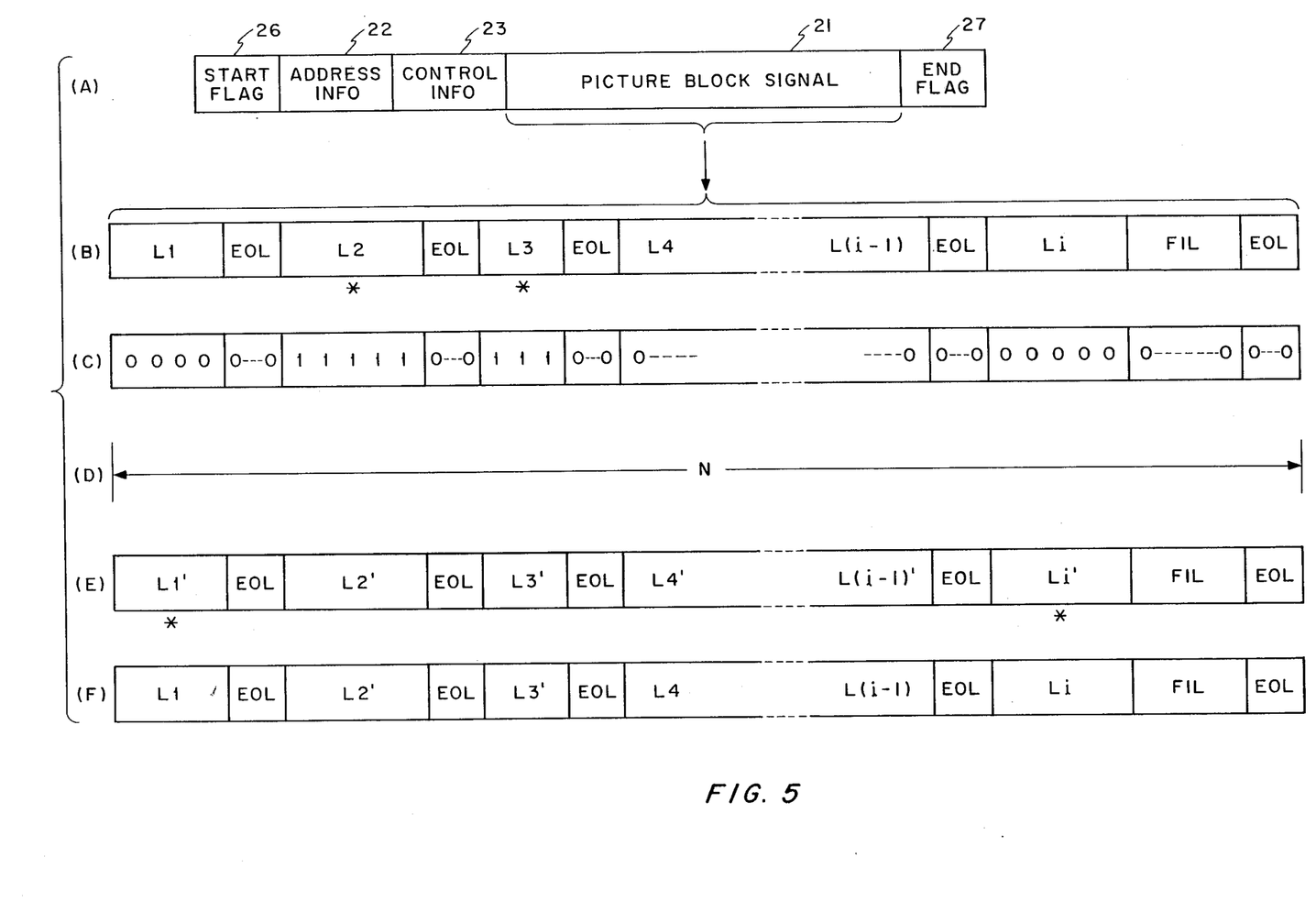
FIG. 5 shows a pattern signal frame for use by the picture block retransmission arrangement depicted in FIG. 4.

Reference will be had to a portion of FIG. 5 for a short while. In the manner depicted in a figure part (A) and like in FIG. 2, each frame of the encoded signal has a frame format which comprises the picture block signal 21, the address and the control information 22 and 23, and the start and the end flags 26 and 27. It should be noted in this connection that the frame format need not include the frame check sequence 24 described in conjunction with FIG. 2.

As depicted in figure parts (B) through (D) of FIG. 5, each picture block signal 21 comprises first through i-th picture line signals L1, L2, ..., L(i−1), and Li of line signal lengths which are variable according to the number of run lengths along each picture line. The picture block signal 21 furthermore comprises an end-of-line signal EOL next succeeding each of the first through the (i−1)-th picture line signals and a like end-of-line signal EOL after the i-th picture line signal Li with a filling signal FIL interposed between the 1-th picture line signal Li and the end-of-line signal EOL therefor. The filling signal FIL is for giving the above-described predetermined block length to the picture block signal 21 when a sum of the line signal lengths of the first through the i-th picture line signals and lengths of the end-of-line signals therefore is shorter than the predetermined block length and furthermore when the i-th picture line signal Li is next followed by a picture line signal (not shown) of a line signal length which is longer than a difference between the sum and the predetermined block length. As shown in the figure part (C), each of the end-of-line signals EOL's and of the filling signal FIL is a succession of binary zeroes in the example being illustrated. The predetermined block length is indicated by a reference letter N in the figure part (D).

Referring back to FIG. 4, a frame converter 36 is for arranging the picture line signals supplied from the encoder 16 into successive transmission frames of the frame format illustrated with reference to the figure parts (A) through (D) of FIG. 5. The transmission frames are temporarily stored in a transmitter buffer 37 and then delivered to the modem 12 for transmission to the transmission path 13 as the above-mentioned modulated signal.

Incidentally, it should be understood that two connections between the control unit 15 and the scanning device 32 and between the control unit 15 and the encoder 16 are depicted in FIG. 1 by a single connection between the control unit 15 and the encoder 16. It should furthermore be understood that the above-described counterpart transmitter has a similar structure and is therefore depicted as the transmitter in FIG. 4. The retransmission request signal is received by the modem 12 and sent to the transmitter buffer 37 in the counterpart transmitter to select the transmission frame or frames with reference to the address information 22 (FIG. 5(A)) for retransmission. In this event, the modem 12 may send the retransmission request signal to the transmitter buffer 37 through the picture block retransmission arrangement 11 through the connection depicted in FIG. 1.

When the illustrated transmitter/receiver receives a modulated signal of the type described from a counterpart transmitter, the model 12 produces the above-mentioned demodulated signal which comprises reproductions of the respective transmission frames as reception frames. A receiver buffer 38 is for temporarily storing the reception frames and then for successively delivering the reception frames to a block separator 39. Each reception frame comprises a reproduction of the picture block signal 21 (FIG. 5(A)) as a picture block reproduction which comprises, in turn, a plurality of reproductions of the respective picture line signals, such as Li through Li, as picture line reproductions. From each reception frame, the block separator 39 separates the picture block reproduction and the picture line reproductions for storage in a storage memory 41 in the manner which will later be described in detail.

The decoder 17 decodes each picture line reproduction into the afore-mentioned reproduced line signal consisting of reproductions of the picture element signals which are encoded in the counterpart transmitter into the picture line signals according to the run lengths. It is therefore possible to understand that the decoder 17 furthermore decodes each picture block reproduction into the above-mentioned reproduced block signal. In any event, a succession of the reproduced line signals of the successive reproduced block signals will be called a receiver binary signal. At the same time, the decoder 17 produces a sequence of run length clock pulses, one for each run length.

It is now understood that the modem 12 serves as a main element of a processing arrangement for processing each picture block signal transmitted from the counterpart transmitter into the picture block reproduction which comprises the picture line reproductions corresponding to the respective picture line signals and consequently to the successive picture lines, respectively. The decoder 17 decodes the picture line reproductions into the afore-mentioned first block signal with the picture line reproductions decoded into the respective reproduced line signals. A combination of the processing arrangement and the decoder 17 serves as a decoding arrangement for decoding each picture block signal transmitted from the counterpart transmitter into the reproduced block signal comprising the reproduced line signals. The decoder 17 furthermore produces the run length clock pulses corresponding to the picture elements represented by each reproduced line signal. Depending on the circumstances, the run length clock pulses can be referred to simply as clock pulses because each run length represents a certain number of picture elements.

Supplied with the run length clock pulses from the decoder 17, a run length counter 42 counts up a run length count which represents the number of picture elements in each reproduced line signal. It is to be noted for the example being illustrated that each correct line signal represents 1,728 picture elements and that each incorrect line signal does not. An element number comparator 43 compares the run length count with 1,728 to produce an incoincidence signal only when the run length count is not equal to 1,728 for each reproduced line signal, namely, only when the reproduced line signal is not a correct reproduction of the transmitter binary signal for each picture line.

When the run length clock pulses are referred to merely as the clock pulses, the run length counter 42 can be called an element number counter responsive to the clock pulses produced by the decoder 17 for each reproduced line signal for counting up an element count. The element number comparator 43 compares the element count with the prescribed number which is equal to 1,728 for the example being illustrated. The element number comparator 43 thereby produces the incoincidence signal whenever the element count is not equal to the prescribed number. Each reproduced line signal is the correct and the incorrect line signals when the incoincidence signal is not and is produced therefor, respectively. It is now understood that a combination of the element number or run length counter 42 and the element number comparator 43 serves as a checking arrangement for checking whether each reproduced line signal is the correct line signal or is the incorrect line signal.

When produced from the element number comparator 43, the incoincidence signal is delivered forward to an incoincidence counter 44 and furthermore delivered back to the storage memory 41 for the purpose which will later be described. Responsive to the incoincidence signal or signals produced for each reproduced block signal, the incoincidence counter 44 counts up an incoincidence count. It will be presumed that the above-described predetermined number is one as before. Comparing the incoincidence count with one, an incoincidence comparator 45 delivers the above-mentioned tone signal to the control unit 15 whenever the incoincidence count reaches the predetermined number.

The control unit 15 deals with the tone signal supplied from the incoincidence comparator 45 in the manner which will shortly become clear. For the time being, the control unit 15 delivers the tone signal to the modem 12 through the connection depicted in FIG. 1 between the control unit 15 and the modem 12. The modem 12 transmits the retransmission request signal to the counterpart transmitter. A combination of the control unit 15 and the modem 12 serves as a retransmission requesting arrangement responsive to the tone signal for requesting the counterpart transmitter to transmit the retransmitted block signal described earlier. It is now understood that an assembly of the incoincidence counter 44, the incoincidence comparator 45, and the retransmission requesting arrangement serves as a retransmission requesting assembly for requesting the counterpart transmitter to transmit the retransmitted block signal when the incorrect line signals of each reproduced block signal are not less in number than the predetermined number.

When produced in response to the picture block signal transmitted from the counterpart transmitter previous to the retransmitted block signal, the picture block reproduction and the picture line reproductions will be called a previous block reproduction and previous line reproductions. Responsive to the retransmitted block signal, a combination of the modem 12 and the receiver buffer 38 serves as a buffer arrangement for storing the picture block reproduction and the picture line reproductions as a new block reproduction and new line reproductions. The previous and the new line reproductions correspond to the respective picture lines. When supplied with the new block reproduction through the storage memory 41, the decoder 17 decodes the new block reproduction into the second or the new block signal mentioned before and each new line reproduction into the again reproduced line signal described earlier. Moreover, the decoder 17 produces the run length clock pulses for each again reproduced line signal.

Figure 6:
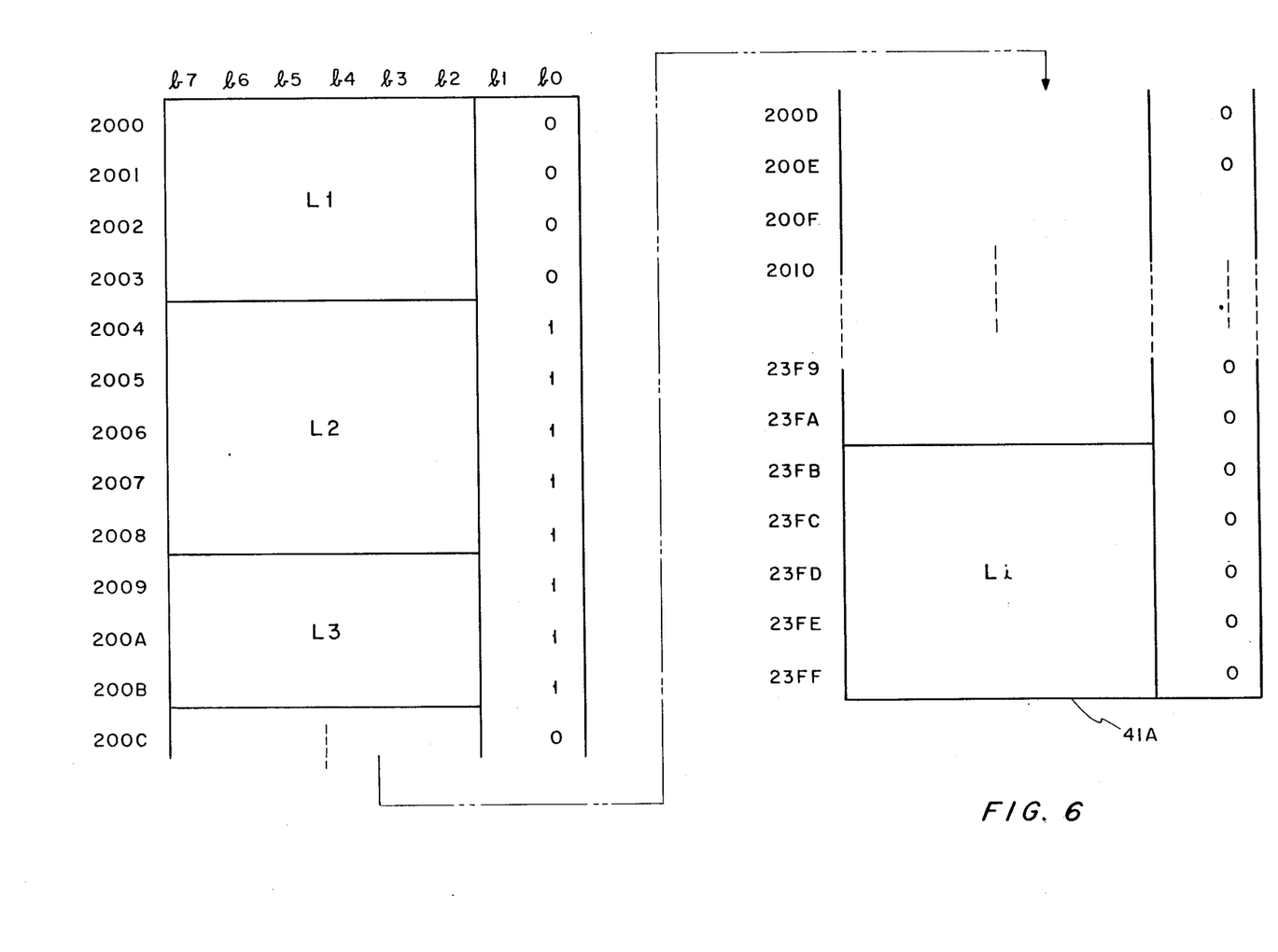
FIG. 6 shows picture line reproductions which are memorised in a portion of a storge memory of the picture block retransmission arrangement illustrated in FIG. 4.

Turning temporarily to FIG. 6, a memory area 41A is included in the storage memory 41 (FIG. 4) for one of the picture block reproductions which are successively supplied from the receiver buffer 38. The memory area 41A comprises zeroth through 1,023-rd memory sections or segments, 1,024 in number. In the example being illustrated, the memory sections are given section addresses 2000 through 23FF in the hexadecimal representation. Each memory section has zeroth through seventh bit positions b0 to b7 for a signal portion of an eight-bit byte.

Depending on the line signal length, each picture line reproduction is stored in the second through the seventh bit positions b2 to b7 of a certain number of memory sections. Consideration will be given to the picture block signal 21 illustrated with reference to the figure part (B) of FIG. 5. First through i-th picture line reproductions are derived by the block separator 39 described in conjunction with FIG. 4. The first through the i-th picture line reproductions will be designated again by the reference symbols L1 through Li merely for simplicity of designation.

In the example being illustrated, the first picture line reproduction is stored in the second through the seventh bit positions b2 to b7 of the zeroth through the third memory sections, four in number. Similarly, the second picture line reproduction L2 is stored in the fourth through the eighth memory sections, five in number. The third picture line reproduction L3 is stored in the ninth through the eleventh memory sections, three in number. It will be presumed that the i-th picture line reproduction Li is stored in the second through the seventh bit pisitions b2 to b7 of the 1,019-th through the 1,023-rd memory sections, five in number.

Referring again to FIG. 4 in addition to FIGS. 5 and 6, it will be assumed that the second and the third picture line signals L2 and L3 are received as erroneous line reproductions in the manner indicated in the figure part (B) by asterisks. The run length comparator 43 produces the incoincidence signals at time instants at which the decoder 17 decodes the second and the third line reproductions L2 and L3 into the incorrect line signals. Sent back to the storage memory 41, the incoincidence signals store binary ones in the zeroth bit positions b0 of the memory sections in which the second and the third line reproductions L2 and L3 are stored. Otherwise, a binary zero is stored in each zeroth bit position b0. It will readily be possible for those skilled in the art to implement an arrangement for storing the binary ones and zeros in the memory area 41A of the storage memory 41 in correspondence to presence and absence of the incoincidence signal.

Such binary ones and zeros are used as discrimination data indicative of whether or not each picture line reproduction is the erroneous line reproduction. The discrimination data are depicted in the figure part (C) of FIG. 5 for the respective picture line reproduction with information bits of the respective picture line reproductions omitted. As the case may be, only the discrimination datum indicative of each erroneous line reproduction will be referred to merely as a discrimination datum, with the first-mentioned discrimination data called marks. In this manner, the memory area 41A is for storing the picture line reproductions and is responsive to each incoincidence signal for moreover storing the last-mentioned discrimination datum along with an erroneous line reproduction which is one of the previous line reproductions that is decoded by the decoder 17 into the incorrect line signal to produce the incoincidence signal in question.

In the manner depicted in a figure part (E) of FIG. 5, the retransmitted block signal consists of the first through the i-th picture line signals and the end-of-line and the filling signals. The first through the i-th picture line signal of the retransmitted block signal are designated by reference symbols L1', L2', . . . , and L1' in consideration of the description which follows. In the manner described above, first through i-th new line reproductions are stored in the buffer arrangement in correspondence to the first through the i-th picture line signals. The first through the i-th new line reproductions will be designated again by the reference symbols L1' through L1'. It will be assumed that the first and the i-th new line reproductions are erroneous line reproductions as indicated by asterisks.

In FIG. 4, the storage memory 41 produces a zeroth bit signal representative of the binary ones and zeros stored in the zeroth bit positions b0 of the respective memory sections described in connection with FIG. 6. Responsive to the zeroth bit signal, a discriminator 46 discriminates whether or not each previous line reproduction is the erroneous line reproduction. The discriminator 46 thereby supplies the control unit 15 with a discrimination signal whenever the zeroth bit signal indicates an erroneous line reproduction. In the example being illustrated, such discrimination signals are produced for the second and the third previous line reproduction L2 and L3 (FIG. 5 (B) or (C) and FIG. 6).

Responsive to the discrimination signal, the control unit 15 delivers a substitution or renewal signal to the storage memory 41. Meanwhile, the buffer arrangement delivers the new picture block reproduction to the storage memory 41. In the memory area 41A illustrated with reference to FIG. 6, such substitution signals renew the second and the third previous line reproductions L2 and L3 to the second and the third new line reproductions L2' and L3' to renew the previous block reproduction to a renewed block reproduction or signal.

In the manner illustrated in a figure part (F) of FIG. 5, the renewed block reproduction comprises the first picture line reproduction L1, the second and the third new line reproductions L2' and L3', and the fourth through the i-th picture line reproductions L4 (not shown) to Li. In the example being illustrated, the renewed block reproduction has no error.

In FIG. 4, the decoder 17 decodes the renewed block reproduction again into a reproduced block signal which is herein called a substituted block signal. The previous line reproductions are decoded into previous line signals. Each of the new line reproductions is decoded into a new line signal, namely, the aforementioned again reproduced line signal. Although similarly named, the last-mentioned substituted block signal is quite different from that described in conjunction with FIGS. 1 and 2 in that the last-mentioned substituted block signal is obtained by substitution of the again reproduced line signal for each incorrect line signal on a line-by-line basis rather than on the block-by-block basis described earlier. The last-mentioned substituted block signal will hereafter be referred to simply as a substituted block signal. Alternatively, the checking arrangement may check only each of the new line signal used for the incorrect line signals whether each of such new line signals is the correct or the incorrect line signal.

For the example being illustrated, the incoincidence comparator 45 finds no error in the substituted block signal. Retransmission is therefore no more necessary. The decoder 17 delivers the substituted block signal to a recorder 49 as the output signal 32 described in connection with FIG. 1. The run length clock pulses are also supplied to the recorder 49 from the decoder 17 to indicate successive picture elements of the substituted block signal and, if any, of the reproduced block signal in which no incorrect line signals is found. Retransmission becomes necessary for the twice retransmitted block signal described before only when the substituted block signal includes the incorrect line signals which are not less in number than the predetermined number.

It is now understood that a combination of the receiver buffer 38, the discriminator 46, and the control unit 15 serves as a renewing arrangement responsive to each of the last-mentioned discrimination data for renewing the erroneous line reproduction to one of the new line reproductions stored in the buffer arrangement that corresponds to the picture line corresponding to the erroneous line reproduction. The renewed block signal is supplied from the storage memory 41 to the decoder 17. An assembly of the buffer arrangement, the memory area 41A, the renewing arrangement, and the decoder 17 serves as a substituting assembly for substituting the again reproduced line signal for each incorrect line signal to produce the substituted block signal when both the again reproduced line signal and the last-mentioned each incorrect line signal correspond to a single one of the successive picture lines.

Figure 7:
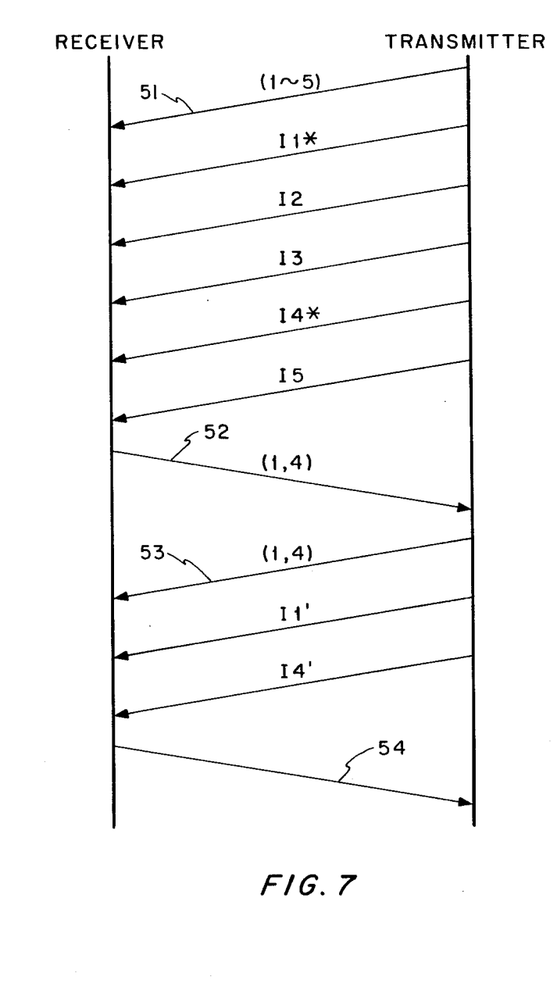
FIG. 7, drawn on the right-hand side of FIG. 3 merely for convenience of illustration, shows a sequence of operation carried out for retransmission of at least one picture block signal by the picture block retransmission arrangement depicted in FIG. 4.

Finally referring to FIG. 7, operation is as follows in practice when the transmitter/receiver comprises a picture block retransmission arrangement according to this invention. The counterpart transmitter transmits at first a transmission start signal 51 which indicates that an original pattern will be sent as a picture signal which comprises first through fifth transmission frames 11 to 15. Subsequently, the picture block signals are sent in the first through the fifth transmission frames.

In the receiver, first through fifth reception frames are produced immediately upon reception of the first through the fifth transmission frames through the facsimile transmission network. The first through the fifth reception frames are stored in the memory area 41A (FIG. 6) successively one at a time.

For each reception frame stored in the memory area 41A, the checking arrangement checks whether each reproduced line signal is the correct line signal or is the incorrect line signal. The retransmission requesting assembly requests the counterpart transmitter to transmit the retransmitted block signal if the incorrect line signals are not less in number than the predetermined number for the reception frame stored in the memory area 41A. The above-mentioned tone signal may be kept in the control unit 15 (FIG. 1 or 4). It will be assumed that the tone signals are produced for the first and the fourth reception frames in the manner indicated by asterisks for the first and the fourth transmission frames 11 and 14. After the first through the fifth reception frames are checked in this manner, the receiver transmits a retransmission request signal 52 to the counterpart transmitter. In the example being illustrated, the retransmission request signal 52 indicates the first and the fourth transmission frames for retransmission by the address information 22 (FIG. 5 (A)) of such transmission frames.

In response, the counterpart transmitter transmits a retransmission start signal 53 which specifies the first and the fourth transmission frames for retransmission and which is followed by the first and the fourth transmission frames retransmitted as first and fourth retransmitted frames 11' and 14'. The substituting assembly produces the substituted block signals for the first and the fourth retransmitted frames. The renewed block reproductions are formed in the memory area 41A successively one at a time for the first and the fourth retransmitted frames as first and fourth renewed block reproductions. If the checking arrangement finds no error in the substituted block signals derived from the first and the fourth renewed block reproductions, the receiver transmits a transmission end signal 54 to the counterpart transmitter. In the counterpart transmitter, the transmission frames may be erased from the transmitter buffer 37 in response to the transmission end signal 54 delivered from the receiver under consideration and supplied through the modem 12 and the control unit 15 of the counterpart transmitter. In the meanwhile, the decoder 17 (FIG. 1 or 4) of the receiver in question produces the reception binary signal for the first renewed block reproduction, the second and the third picture block reproductions, the fourth renewed block reproduction, and the fifth picture block reproduction. Transmission of the original pattern completely comes to an end.

While this invention has thus far been described in specific conjunction with a single preferred embodiment thereof, it will now be readily possible for one skilled in the art to put this invention into effect in various other manners. For example, the storage memory 41 can be used between the decoder 17 (FIG. 4), on the one hand, and the control unit 15, the recorder 49, and others, on the other hand, although the illustrated example is more preferred. It is known in the art to modest the errors of a duration of about one picture line on a received copy of, for example, the facsimile transmission by substituting a next preceding picture line for the picture line in question. It is therefore possible with a picture block retransmission arrangement according to this invention to relax the conditions for retransmission request, for instance, by requesting the retransmission only when the errors are found in two or more consecutive picture lines rather than in two or more lines which are interposed in a picture block by at least one picture line. This is in marked contrast to a conventional picture block retransmission arrangement whereby it is impossible to relax the condition for retransmission request. The band-compression encoding can be carried out by the use of band-compression codes other than the modified Huffman codes. The facsimile network may be a transmission network for different picture or pattern signals.

What is claimed is:

1. A picture block retransmission arrangement of a receiver for use in combination with a transmitter for transmitting a picture block signal comprising a plurality of band-compression encoded picture line signals which are representative of successive picture lines of an original pattern, respectively, said receiver comprising decoding means for decoding the picture block signal transmitted from said transmitter into a reproduced block signal comprising a plurality of reproduced line signals which are representative of said successive picture lines to correspond to the respective picture lines, wherein the improvement comprises, checking means for checking whether each of said reproduced line signals is a correct line signal correctly representative of a corresponding one of said successive picture lines or is an incorrect line signal which is not correctly representative of a corresponding one of said successive line signal;

retransmission requesting means for requesting said transmitter to again transmit said picture block signal as a retransmitted block signal when the incorrect line signals are not less in number than a predetermined number and substituting means for substituting an again reproduced line signal for each said incorrect line signal to produce a substituted block signal when both said again reproduced line signal and said each incorrect line signal correspond to a single one of said successive picture lines, said again reproduced line signal being one of the reproduced line signals of the reproduced block signal into which said retransmitted block signal is decoded by said decoding means.

2. A picture block retransmission arrangement as claimed in claim 1, wherein, said checking means is furthermore for checking whether each said again reproduced line signal of said substituted block signal is said correct line signal or is said incorrect line signal;

said retransmission requesting means being for requesting said transmitter to twice transmit said picture block signal only when the incorrect line signals of said substituted block signal are not less in number than said predetermined number.

3. A picture block retransmission arrangement as claimed in claim 2, said decoding means comprising processing means for processing each said picture block signal transmitted from said transmitter into a picture block reproduction which comprises a plurality of picture line reproductions corresponding to the respective picture line signals, and a decoder for decoding said picture block reproduction into the reproduced block signal with said picture line reproductions decoded into the respective reproduced line signals, said decoder being furthermore for producing a sequence of clock pulses corresponding to picture elements represented by each said respective reproduced line signal, wherein said checking means comprises;

an element number counter responsive to the clock pulses produced for each reproduced line signal for counting up an element count; and     an element number comparator for comparing said element count with a prescribed number to produce an incoincidence signal whenever said element count is not equal to said prescribed number, each said respective reproduced line signal being said correct and said incorrect line signals when said incoincidence signal is not and is produced, respectively.

4. A picture block retransmission arrangement as claimed in claim 3, wherein said retransmission requesting means comprises:

an incoincidence counter responsive to the incoincidence signals produced for each said reproduced block signal for counting up an incoincidence count;

an incoincidence comparator for comparing said incoincidence count with said predetermined number to produce a tone signal whenever said incoincidence count reaches said predetermined number; and     means responsive to said tone signal for requesting said transmitter to again transmit and to twice transmit said picture block signal when said tone signal is produced in response to the incoincidence count for a previous block signal and for said substituted block signal, respectively, said previous block signal being the reproduced block signal derived from the picture block signal transmitted from said transmitter previous to said retransmitted block signal.

5. A picture block retransmission arrangement as claimed in claim 3, the picture line reproduction of each picture block reproduction corresponding to the respective picture lines, wherein said substituting means comprises,     buffer means for storing at least new line reproductions which are the picture line reproductions of the picture block reproduction produced by said processing means from said retransmitted block signal;

a memory area for storing previous line reproductions which are the picture line reproductions of the picture block reproduction produced by said processing means from the picture block signal transmitted from said transmitter previous to said retransmitted block signal, said memory area being responsive to said incoincidence signal for furthermore storing a discrimination datum along with an erroneous line reproduction which is the previous line reproduction decoded by said decoder into each said incorrect line signal;

renewing means responsive to said discrimination datum for renewing said erroneous line reproduction in said memory area to one of the new line reproductions stored in said buffer means to make said memory area store a renewed block reproduction comprising said one of the new line reproductions in place of each erroneous line reproduction, said one of the new line reproductions corresponding to one of said seccessive picture lines to which said erroneous line reproduction corresponds; and means for supplying said renewed block reproduction to said decoder to make said decoder produce said substituted block signal with said one of the new line reproduction decoded into said each again reproduced line signal.

\* \* \* \* \*